United States Patent [19]

Nozoe et al.

[11] Patent Number: 5,867,281

[45] Date of Patent: *Feb. 2, 1999

[54] ELECTRONIC MAIL SYSTEM AND METHOD

[75] Inventors: Takahiko Nozoe, Yokohama, Japan; Hideki Kuwamoto, College Park, Md.; Chiyo Akamatsu; Tadashi Kuwabara, both of Yokohama, Japan

[73] Assignee: Hitachi, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 576,308

[22] Filed: Dec. 21, 1995

[30] Foreign Application Priority Data

Dec. 22, 1994 [JP] Japan ................................. 6-320334

[51] Int. Cl.⁶ ............................. H04N 1/00; G06F 9/445
[52] U.S. Cl. ......................... 258/402; 358/434; 358/468; 395/712
[58] Field of Search ....................... 358/402, 403, 358/401, 400, 440, 468, 404, 438, 434, 435, 442; 395/701, 702, 703, 705, 710, 712, 92, 671, 651; 379/93.24, 100.01

[56] References Cited

U.S. PATENT DOCUMENTS 5,115,326  5/1992  Burgess et al. ..................... 358/440
5,438,433  8/1995  Reifman et al. .................... 358/468
5,564,018  10/1996 Flores et al. ....................... 358/402

FOREIGN PATENT DOCUMENTS 5-68053   3/1993  Japan .
5-268226  10/1993 Japan .

OTHER PUBLICATIONS

"Local Area Network," Maruzen Co., Limited, pp. 256–275 (Japanese Language).

"TCP/IP Internet Working," Soft Research Center Co., Limited, pp. 26–57.

Cowart, Mastering Windows 3.1, Sybex, 1993, pp. 902–914.

Primary Examiner—Edward L. Coles
Assistant Examiner—Madeleine A. V. Nguyen
Attorney, Agent, or Firm—Antonelli, Terry, Stout & Kraus, LLP

[57] ABSTRACT

An electronic mail system and method enabling a recipient of electronic mail to intuitively and easily perform the processing requested by the sender in the electronic mail. The sender of the electronic mail with the system of the present invention generates information including icons information representing processing functions and operations to be performed by the recipient of the electronic mail and attaches the generated information as added information to the message of the electronic mail to be sent so that appropriate processing is effected by the recipient.

24 Claims, 15 Drawing Sheets

FIG. 8

LIST OF FUNCTION BUTTONS

| APPROVE | MESSAGE APPROVED |
| DIS-APPROVE | MESSAGE DISAPPROVED |
| CIRCU-LATE | CIRCULATE MESSAGE AMONG SPECIFIC PERSONS |
| REPLY | REPLY TO SENDER |

FIG. 9

| FUNCTION BUTTON DISPLAY POSITION | BUTTON ID |
|---|---|
| ---------- | ---------- |
| ---------- | ---------- |
| ---------- | ---------- |

FIG. 13

```
┌─────────────────────────────────────────┐ 1300
│ CREATE MESSAGE                          │
├─────────────────────────────────────────┤ 1301
│  HOLDING MEETING ABOUT XX               │
│  THE MEETING ABOUT XX WILL BE           │
│      HELD AS FOLLOWS :                  │
│                                         │
│                  —      —               │
│                                         │
│  DATE AND TIME : FROM X:XX, XX DAY, X MONTH │
│          PLACE : MEETING ROOM XXXX      │
│                                         │
│                                         │
│  SELECT ATTEND OR NOT ATTEND            │
│       THEN     REPLY                    │
│                                         │
│                                         │
│  REMARKS:                               │
│     REFERENCE PROVIDES MEETING MATERIAL │
│                                         │
└─────────────────────────────────────────┘
```

ELECTRONIC MAIL SYSTEM AND METHOD

The present invention relates to an electronic mail system and method for supporting the execution of processing to be performed in electronic mailing.

BACKGROUND OF THE INVENTION

For systems for supporting the processing in electronic mailing, a system has been known which supports the execution of a series of processing operations such as sending mail along a circulation path, for example. Associated with the above-mentioned known electronic mail system are an electronic mail system disclosed in Japanese Patent Application Laid-Open No. Hei 5-268226 (1993) and a mail system disclosed in Japanese Patent Application Laid-Open No. Hei 5-68053 (1993).

The mail system of Japanese Patent Application Laid-Open No. Hei 5-68053 adds voice and image data, operator guidance, a format for reply entry and the like to electronic mail information to allow a recipient to follow the operator guidance and format entry operational procedure intended by a sender. With the electronic mail system of Japanese Patent Application Laid-Open No. Hei 5-268226, its host computer is provided with mail boxes which allow senders to sequentially transfer circulation destination list information and main between the mail boxes by following a circulation order included in the circulation destination list information added to the mail, thereby enabling electronic mail circulation processing between the users.

However, the electronic mail system of Japanese Patent Application Laid-Open No. Hei 5-268226 directs attention only to the method of electronic mail circulation and the method of circulation state confirmation, without considering the method in which an electronic mail recipient performs the processing in electronic mailing. That is, the above-mentioned conventional technique does not consider the ease of operation for the recipients of electronic mails.

The mail system of Japanese Patent Application Laid-Open No. Hei 5-68053 allows an electronic mail recipient to make operations by following the preset operator guidance and reply entry format, but the method in which a sender creates an operator guidance and reply entry format is not considered. That is, this conventional technique does not consider the ease of operation for the senders of electronic mails.

SUMMARY OF THE INVENTION

It is therefore an object of the present invention to provide an electronic mail system and method which enables recipients of the electronic mail to execute intuitively and easily the processing requested by senders of the received electronic mail.

It is another object of the present invention to provide an electronic mail system and method which enables senders of the electronic mail to define easily the processing that the senders requires the recipients to perform.

In carrying out the invention and according to one aspect thereof, there is provided an electronic mail system and method for sending an electronic mail by attaching, to data of the electronic mail, information defining processing that a sender of the electronic mail requests a recipient of the same to perform, including a processing information table in which processing definition information defining processing operations to be performed on the electronic mail and function names for identifying the processing operations are registered in a corresponding manner; a first selector for accepting the selection of any function name from among the function names registered in the processing information table; a first icon generator for generating icons corresponding one by one to function names selected by the first selecting means; a second selector for accepting the selection of icons from among the icons generated by the first icon generator, the selected icons corresponding to the function names identifying the processing operations to be performed by the recipient of the electronic mail; a processing flow definer for accepting the specification of a sequence of a plurality of icons included in the icons selected by the second selector; a first display for displaying the selected icons in a message of the electronic mail at positions specified by a user; and an attacher for attaching, to the data of the electronic mail, icon sequence information for defining the sequence of the icons specified by the processing flow definer and correspondence information in which positional information for specifying the positions in the message of the icons displayed by the first display is related to the function names corresponding to the icons; wherein the icon sequence of which specification has been accepted by the processing flow definer specifies a sequence of executing the processing operations identified by the function names corresponding to the icons, the processing operations to be executed by a recipient of the electronic mail, and the icons are generated, on the receiving side of the electronic mail, in the message at the positions specified by the positional information.

According to another aspect of the present invention, there is provided an electronic mail system and method having on the receiving side of the electronic mail, a third icon generator for referencing the correspondence information attached by the attacher to obtain the positional information of the icons and generate the icons in the message of the received electronic mail at the positions specified by the obtained positional information; and an executer for referencing the correspondence information attached by the attacher, if the icons are specified according to the sequence of the icons defined by the sequence information of the icons attached by the attacher, to obtain the function names corresponding to the icons, referencing the processing information table to obtain processing execution information identified by the function names corresponding to the icons, thereby executing the processing.

According to the electronic mail system and method of the present invention, when the first selector receives the selection of any function name from among the function names registered in the processing information table, the first icon generator generates icons that correspond one-to-one to the function names selected by the first selector. In addition, when the second selector has received the selection of icons corresponding to function names identifying the processing to be performed by the recipient of the electronic mail to be sent from among the icons generated by the icon generator, the processing flow definer receives the specification of the sequence of a plurality of icons included in the icons selected by the second selector. The first display displays the above-mentioned selected icons in the message of the electronic mail to be sent at user-specified positions. Then, the attacher attaches, to the data of the electronic mail, icon sequence information for defining the sequence of the icons specified by the processing flow definer and correspondence information in which positional information for specifying the positions in the message of the icons displayed by the first display is related to the function names corresponding to the icons.

The above-mentioned setup of the present invention allows the sender of the electronic mail to easily register, as information additional to the electronic mail, the processing the sender requests, in the electronic mail, the recipient of the same to perform. In addition, the setup allows the sender to combine the registered individual processing operations, thereby defining the processing operations in time series that the sender requests the recipient to perform. Thus, the sender of the electronic mail can easily create the information to be attached to the electronic mail, the information being about the processing that the sender requests the recipient to perform.

Further, on the receiving side of the electronic mail, the third icon generator references the correspondence information attached to the electronic mail by the attacher to obtain positional information of the above-mentioned icons and generates the icons in the message of the received electronic mail at the positions specified by the obtained positional information. The above-mentioned executor, if the icons have been specified according to the sequence defined in the sequence information attached to the electronic mail by the attacher, obtains the processing execution information identified by the function names corresponding to the icons to perform the processing.

The above-mentioned setup allows the recipient of the electronic mail to intuitively and easily perform the processing registered by the sender in the electronic mail and requested by the sender in the electronic mail to be performed.

These and other objects, features and advantages of the present invention will become more apparent from the following description when taken in conjunction with the accompanying drawings.

BRIEF DESCRIPTION OF THE DRAWINGS

FIG. 8 illustrates an example of a function button list window in accordance with the present invention.

FIG. 9 is a schematic diagram illustrating the structure of data for displaying function buttons in the function button list window in accordance with the present invention.

FIG. 13 illustrates an example of the electronic mail message creating window and an example of the message in accordance with the present invention.

DESCRIPTION OF THE PREFERRED EMBODIMENT

The present invention enables a recipient of electronic mail to intuitively and easily execute the processing that a sender of the electronic mail requires the recipient to execute, the processing being registered beforehand by the sender and the request for the execution of the processing being included in the electronic mail. Additionally, the present invention enables easy definition of the processing that a sender of an electronic mail requires its recipient to execute, means that allows the sender to easily register the processing in the electronic mail as information additional to. the same and means that allows the sender to define the processing operations in time series to be executed by the recipient by combining registered processing operations. These features are more fully described with reference to the drawings in which FIG. 1 is a schematic diagram illustrating the configuration of a system in which the present invention is practiced, for example.

Figure 1:
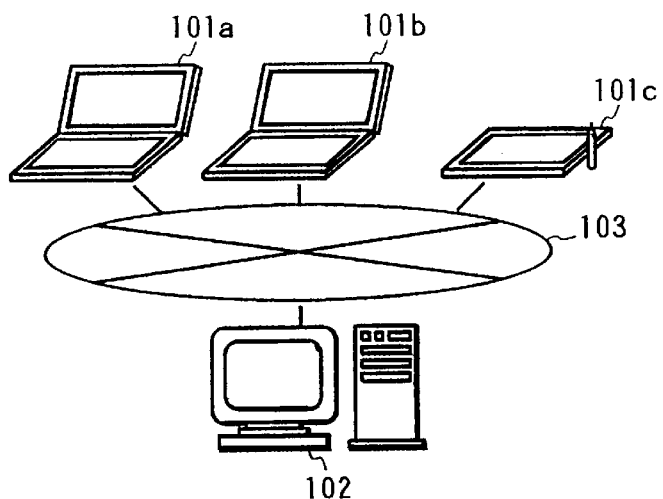
FIG. 1 is a schematic diagram illustrating the constitution of an electronic mail system in accordance with the present invention.

Referring to FIG. 1, the system of the present invention includes information processing units 101a through 101c and a mail server 102 for controlling the processing of transferring electronic mail interconnected by a LAN 103. The information processing units 101a through 101c and the mail server 102 communicate electronic mail with one another via the mail server 102. The mail server 102 is an information processing unit having a hardware configuration to which is equivalent to that of the information processing units 101a through 101c. Connecting the LAN 103 to another LAN via a gateway or the like allows the information processing units in both LANs to transfer electronic mail with each other. For reference, details of electronic mailing are described in "Local Area Network," Maruzen Co., Limited, and details of LAN interconnection are described in "TCP/IP Internet Working," Soft Research Center Co., Limited, for example.

The hardware and software configurations of the information processing units constituting the electronic mail system associated with the present invention; that is, the information processing units 101*a* through 101*c* and the mail server 102 of FIG. 1 are later described with FIG. 2 being a schematic diagram of a hardware configuration of information processing unit 101*a*, for example. The other information processing units constituting the above-mentioned electronic mail system have generally the same configuration as that of the information processing unit 101*a* of FIG. 2.

Figure 2:
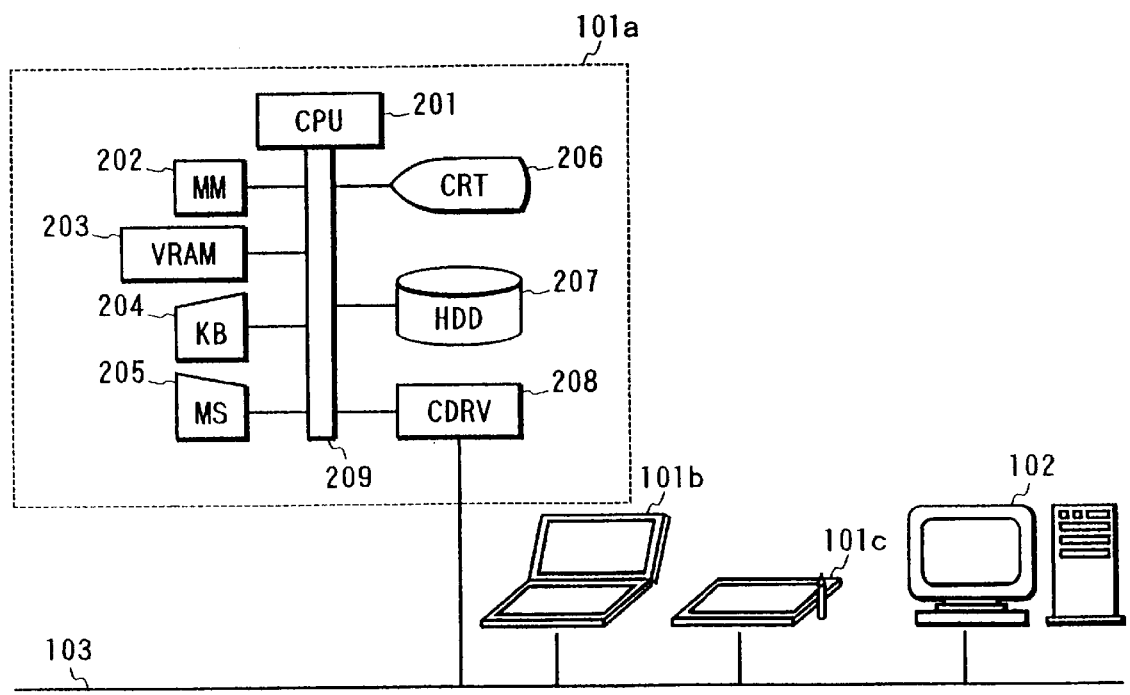
FIG. 2 is a schematic diagram illustrating the hardware configuration of one of the information processing units constituting the electronic mail system of FIG. 1.

The information processing unit of FIG. 2 comprises a central processing unit (CPU) 201, a main memory (MM) 202, a video memory (VRAM) 203, a keyboard (KB) 204, a mouse (MS) 205, a display (CRT) 260, a hard disk drive (HDD) 207, and a communication controller (CDRV) 208. These units are interconnected via bus 209. The CPU 201 executes a variety of programs stored in the main memory 202 which are associated with the transfer of electronic mail and controls the other units interconnected with the bus 209. Instructions and entries for the transfer of electronic mail are made on the keyboard 204 and the mouse 205. The display 206 shows, as instructed by the CPU 201, screen display data stored in the video memory 203. The hard disk drive 207 stores a variety of programs and data associated with the transfer of electronic mail. The communication controller 208 is connected to the LAN 103 to control the communication with other information processing units on the LAN 103. Data of the above-mentioned units are transferred over the bus 209. It is apparent to those skilled in the art that the data entry units, namely the keyboard 204 and the mouse 205, may be replaced with an entry unit using an LCD of a finger- or pen-touch type used on the information processing units 101*b* and 101*c*, for example.

Figure 3:
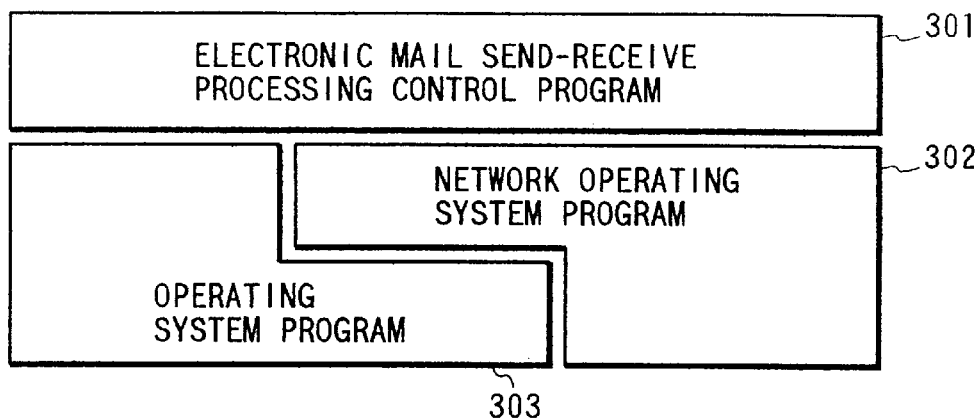
FIG. 3 is a schematic diagram illustrating the software configuration of one of the information processing units constituting the electronic mail system of FIG. 1.

FIG. 3 shows a schematic diagram of an example of a software configuration of the present invention, wherein each of the blocks shown is realized by data stored in the main memory of the information processing unit. In FIG. 3, there is provided an electronic mail send-receive processing control program 301 for performing the send-receive processing of electronic mail associated with the present invention, a network operating system program 302 for controlling the data transfer with other information processing units on the LAN, and an operating system program 303 for controlling the execution of the programs controlling the electronic mail send-receive operations associated with the present invention and for managing files storing data associated with the system of the present invention.

The electronic mail system of the present invention enables the recipient of a mail to intuitively and easily execute the preset processing requested by the sender of the mail in that mail. In addition the electronic mail system enables the sender of an electronic mail to easily register the processing operations that the sender requests the recipient of the electronic mail in that electronic mail as its additional information for easy definition by the electronic sender of these processing operations and enables the sender to combine the individual registered processing operations to define the processing operations in time series to be performed by the recipient.

The processing that the sender requests the recipient to perform, in the electronic mail to be sent, include the processing for sequentially circulating the electronic mail to specified destinations, the processing for returning a reply mail to the source of an electronic mail received by the recipient, the processing for transferring a received electronic mail to a specified destination, the processing for displaying data attached to an electronic mail, the processing for confirming the opening of an electronic mail to automatically notify its source of the opening by the recipient, the processing for copying a received electronic mail to store the same as a file, the processing for deleting a received mail, the processing for converting the electronic mail message to be in the proper format for display by the recipient, the processing for seeing the sender address of the electronic mail, the processing for seeing the specified persons circulating the electronic mail message, the processing for seeing related electronic mail messages, the processing for playing sounds, such as music or voice, and the processing for calling a sender of the electronic mail message by telephone, for example.

Figure 4:
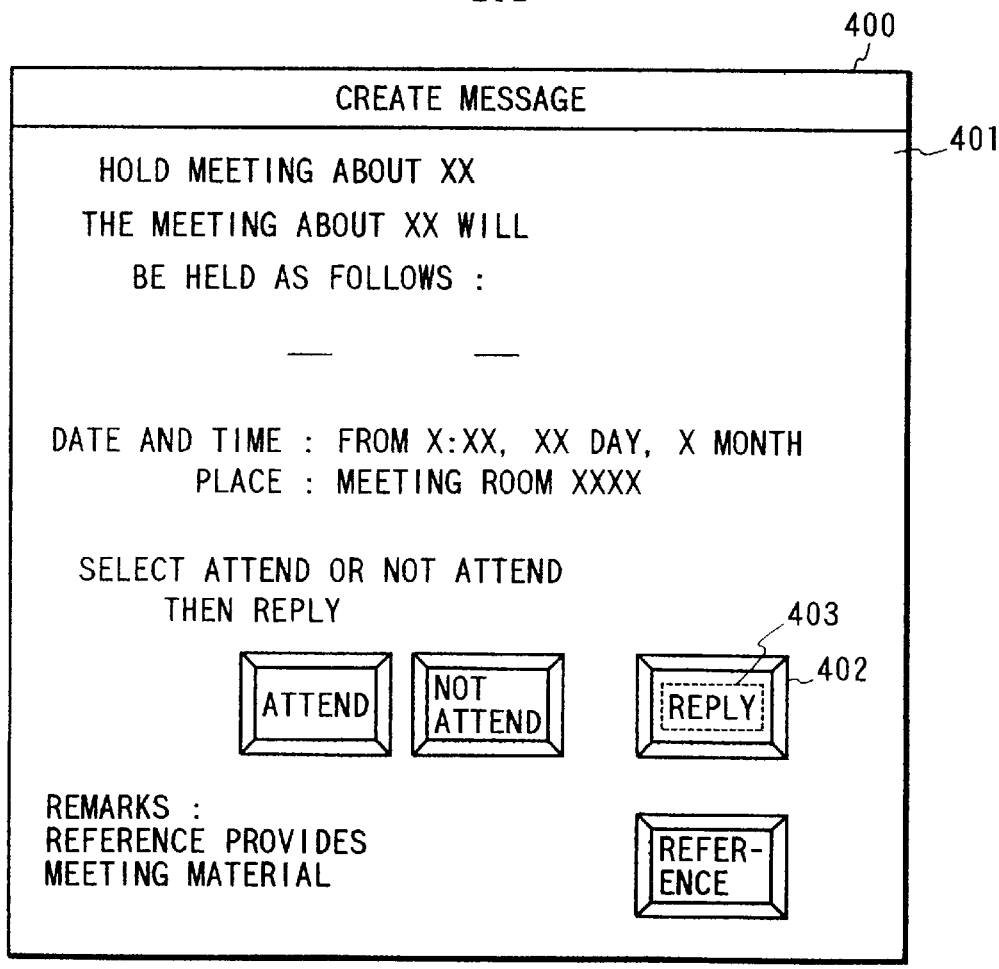
FIG. 4 illustrates an example of a message creating window in accordance with the present invention.
Figure 5:
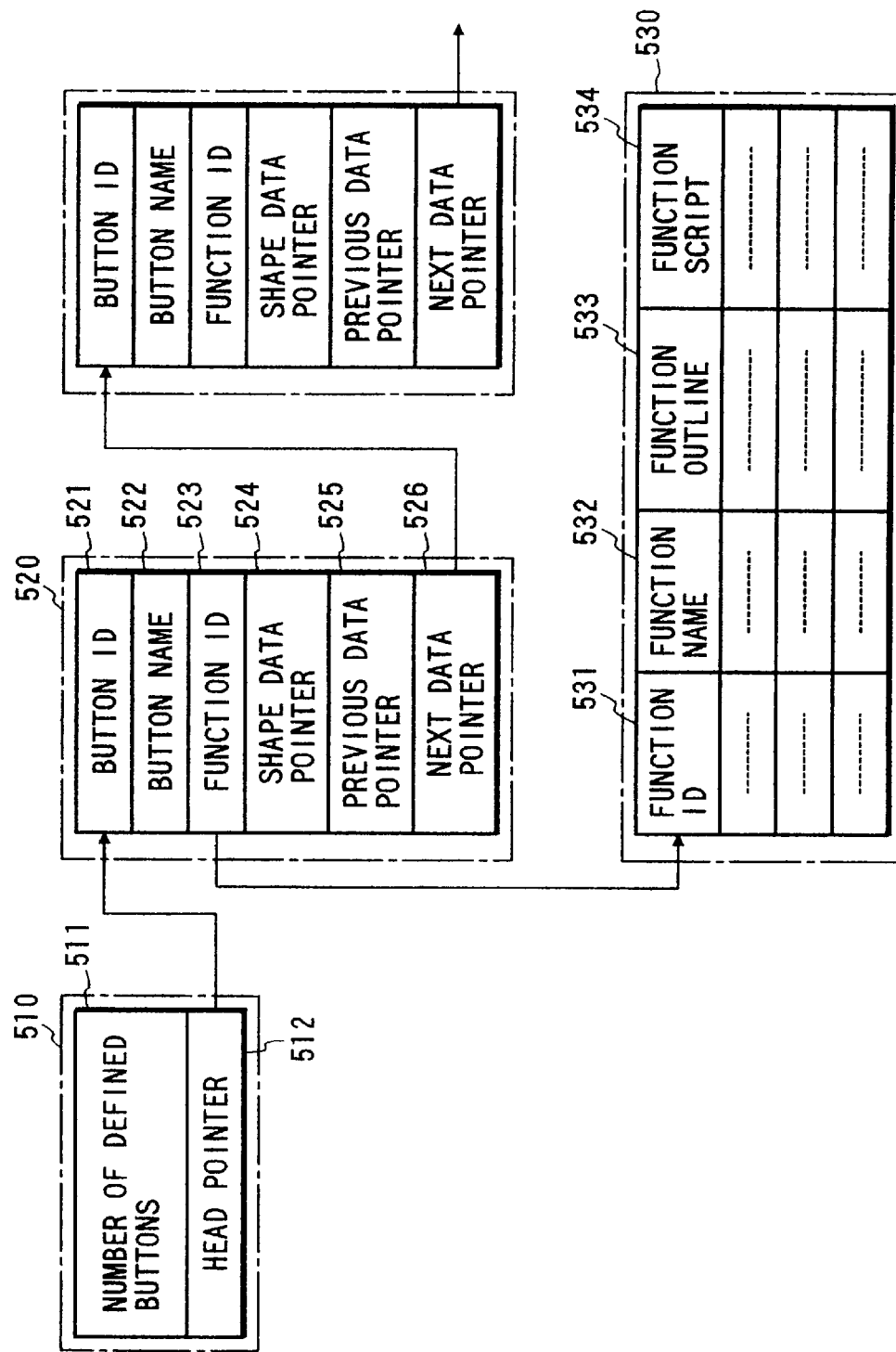
FIG. 5 is a schematic diagram illustrating the structure of data for controlling function buttons in accordance with the present invention.

FIG. 4 shows an example of message displayed in a message generating window of electronic mail, wherein there is provided a message generating window 400 for generating an electronic message, a message display section 401 for showing a message of the electronic message, a function button 402 for executing the processing requested by the sender in the electronic mail, wherein information necessary for a control table having a structure of FIG. 5 is registered in the function button 402, and reference numeral 403 indicates a button name representing the processing to be performed by the function button 402.

The recipient of an electronic mail may only specify the function button displayed on the message display 401 of a received electronic message and execute the specification to easily and securely execute the processing requested by the sender. In addition, the sender may arrange the location of the function button 402 on the message display 401 and provide the name 403 so that the recipient operates the function button 402 more smoothly. For example, as shown in FIG. 4, arranging a function button immediately below a message for performing the processing corresponding to the message allows the recipient who has read the message to operate the button without interrupting the stream of operation. Further, the button name 403 on the function button 402, for example, "REPLY" represents, in a simple and easy-to-understand manner, the processing to be performed, allowing the recipient to effect operation without confusion. It is apparent that such processing execution is also effective for a portable information terminal having no keyboard and mouse. It is also apparent that the function button 402 may be replaced with another graphical element such as an icon, for example.

Thus, in accordance with the present invention, the sender of an electronic mail registers particular processing beforehand to request, in the electronic mail, the recipient to perform the processing and the recipient performs the processing easily. For execution of the processing by the recipient, the function button is utilized, for example, with the processing being described after the description of mail data, namely, the description of a series of processing operations to be performed by the sender to create mail data to be sent.

The manner in which the sender of an electronic mail easily defines the processing that the sender requests the recipient of the electronic mail in the same to perform is now described. More particularly, the manner in which the sender of an electronic mail easily registers processing as additional information of the electronic mail with the processing being specified in the electronic mail to be performed by the recipient of the same, and the manner of combining registered processing operations to allow the sender of an electronic mail to define the processing operations in time series that the sender requests the recipient to perform is described. The sender of an electronic mail easily registers processing as additional information of the electronic mail by registering, in control tables of FIG. 5, information necessary for the above-mentioned function button 402 to execute processing, with the control tables of FIG. 5 being first described.

FIG. 5 shows an example of a data structure of the control table for entering functions of the function button of FIG. 4. For the information processing units constituting the system associated with the present invention to be able to reference a common table, the control table of FIG. 5 is shared by the information processing units or control tables having equal contents are provided for respective information processing units. For implementation, a file server may be provided on the network or the control table may be distributed to each of the information processing units.

Referring to FIG. 5, each of control tables is linked to each other by a list. Reference numeral 510 indicates a header of a control table list and has an area 511 for storing the number of function buttons registered in the control table concerned and an area 512 for storing a pointer of a start control table in the control table list. Reference numeral 520 indicates the control table for holding information associated with the function buttons and has an area 521 for storing a button ID, an identifier of the function button; an area 522 for storing a button name to be displayed on the function button; an area 523 for storing a function ID, an identifier of the processing to be performed; an area 524 for storing a pointer to data for storing shape data of the function button; an area 525 for storing a pointer to a previous control table; and an area 526 for storing a pointer to a next control table, namely a control table 540. The above-mentioned function ID is registered beforehand in the function table 530, related to the processing to be executed in an electronic mail send-receive operation. The function table 530 has an area 531 for storing the function ID, an area 532 for storing a function name of the processing, an area 533 for storing outline information about the function of the processing (to be displayed in a function button list window of FIG. 8 for confirming the information about the registered function buttons, and an area 534 for storing a script written with commands for instructing processing execution. The shape data of the function buttons is required to be stored in advance, and, in the present invention, the shape data is held in the memory area, for example.

Figure 6:
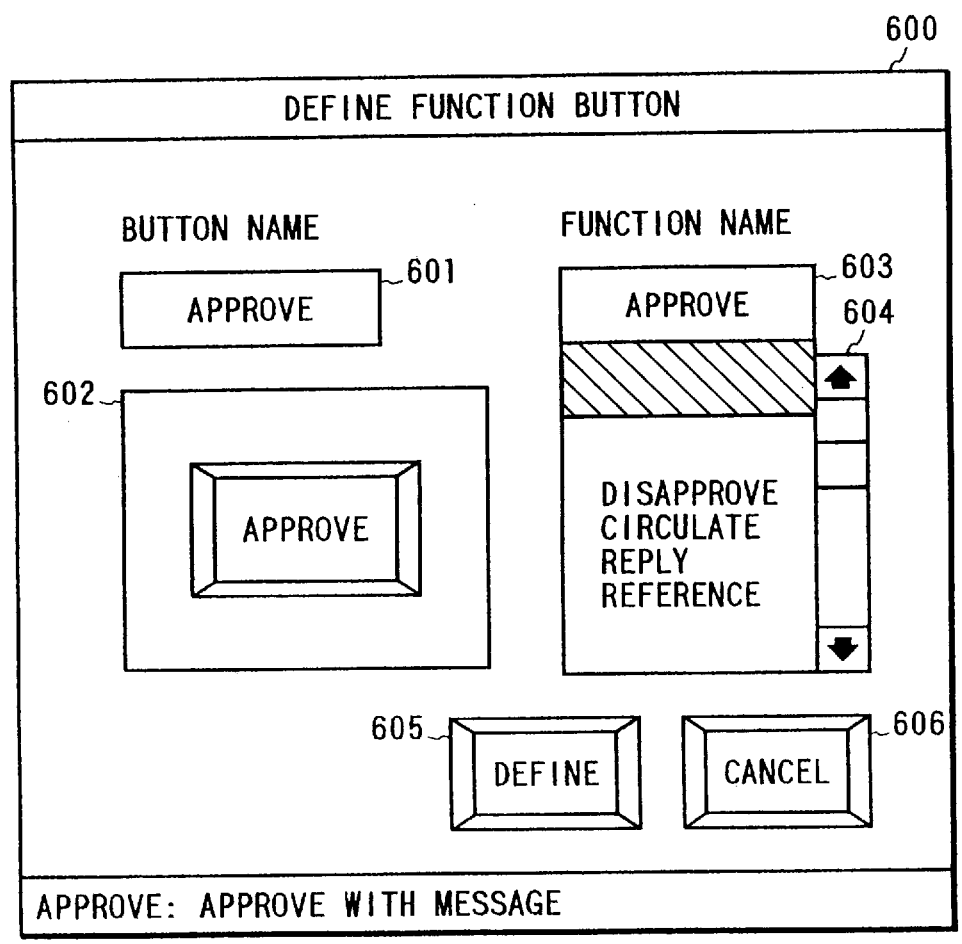
FIG. 6 illustrates example of a function button definition window in accordance with the present invention.

In the present invention, an operator screen such as shown in FIG. 6, for example, is provided for registering the function button information into the above-mentioned control tables. Referring to FIG. 6, reference numeral 600 indicates a function button definition window, namely, the operator screen from which the function button information is registered. Reference numeral 601 indicates a button name entry column for entering a given button name 522, reference numeral 602 indicates an area for displaying a graphic image of a function button, and reference numeral 604 indicates a function list area in which the list of function names 532 stored in the function table 530 of FIG. 5 is displayed. A given function name is selected from the list to be accepted. Reference numeral 603 indicates a function name entry column in which a function name selected from the function name list shown in the function list display area 604 is entered. Reference numeral 605 indicates a definition button for instructing and executing the registration of the function button information, reference numeral 606 indicates a cancel button for discontinuing and invalidating the processing of registering the function button information being performed in the function button definition window 600. In the function button definition window 600, the sender of an electronic mail can easily select desired processing from the function list display area 604 to define a button name that is suitable to the contents of a message to be sent and is easily understood by the recipient.

Figure 7:
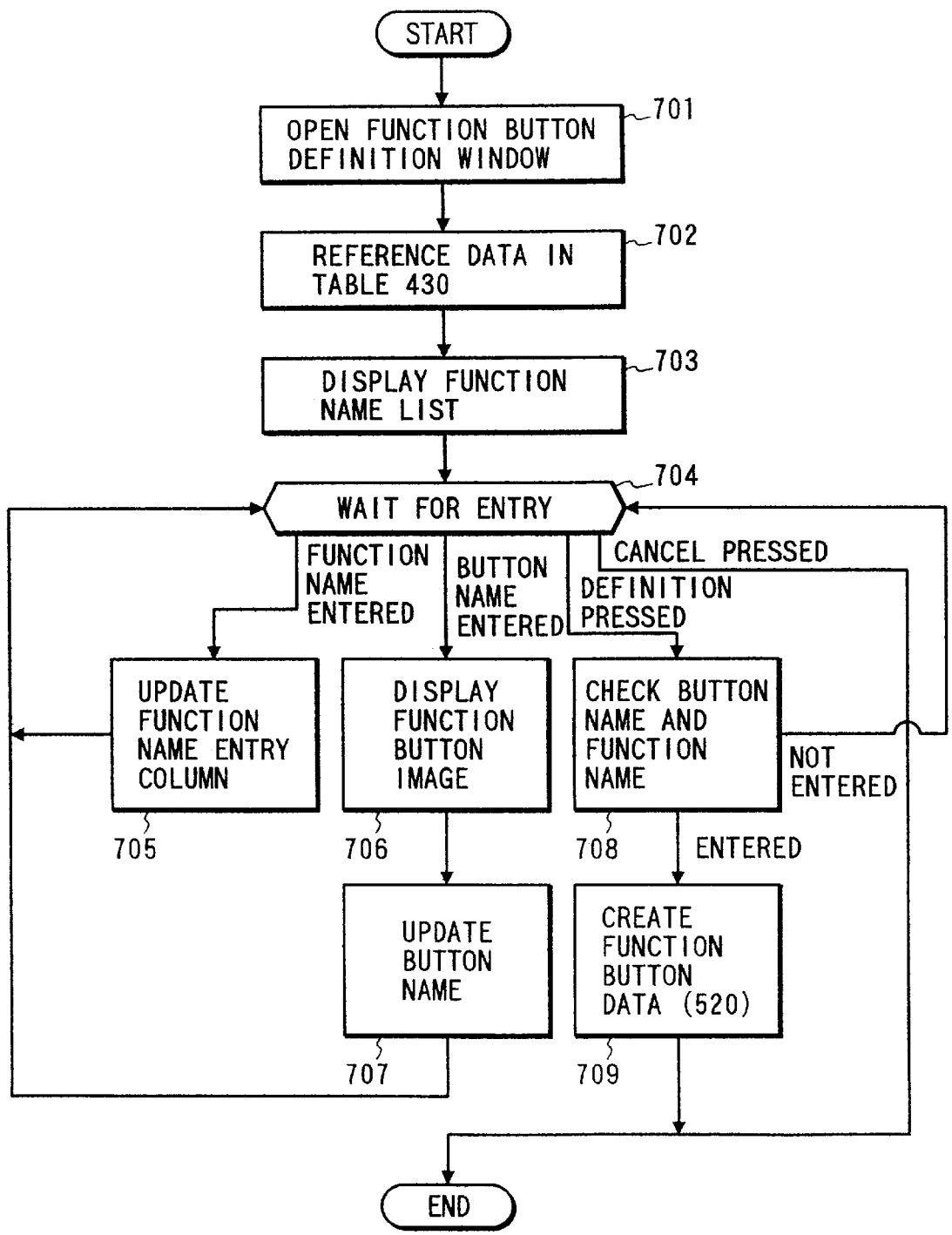
FIG. 7 is a flowchart describing the processing procedure for defining function buttons in accordance with the present invention.

Referring to FIGS. 5 and 6, a processing procedure for registering the function button information in the control table by using the function button definition window will be summarized in FIG. 7, which shows a flowchart indicating the processing procedure for registering the function button information in the system associated with the present invention. When the function button definition window 600 is opened by a user instruction in step 701 of FIG. 7, data stored in the function table 530 is read in step 702. In step 703, the list of the function names 532 stored in the data read in step 702 is displayed in the function list display area 604. In step 704, an entry by the party creating the message of the electronic name, namely the sender of the electronic mail is awaited. If a function name is entered, the processing goes to step 705; if a button name is entered, the processing goes to step 706; if the definition button is pressed, the processing goes to step 708; and if the cancel button is pressed, the function button definition window 600 is closed, upon which the current registration processing is made invalid and ended.

If the function name is entered in step 704, the following processing takes place. When the selection of a particular function name from the function name list displayed in the function list display area is accepted or approved in step 704, the function name accepted in step 704 is displayed in the function name entry column 603 in step 705. When this processing has been performed, the entry wait state in step 704 is resumed.

The processing to be performed when the button name has been entered in step 704 is performed as follows. When the button name has been entered in step 704, a graphic image of the function button is displayed in step 706 and the button name entered in step 704 is displayed on the graphic image of the function button in step 707. When this processing has been performed, the entry wait state in step 704 is resumed.

The processing to be performed when the definition button has been pressed in step 704 is performed as follows. When the definition button has been pressed in step 704, whether the function name and button name have been entered is checked in step 708. If any the buttons has been found not to be entered, the entry wait state of step 704 is resumed. If both have been found to be entered, an area for storing a new control table having the data structure of FIG. 5 is allocated in step 709 and the entered function name, button name, and shape data are registered in the table. Further, the new control table is inserted in the list of the existing control table to update the number of registered function buttons 511 held in the header 510 of the list.

The above-mentioned processing permits easy registration of the function button information in the control table through the function button definition window. The function button may be replaced with another graphic element as mentioned before. Also, the function button may be represented as a non-graphic element such as a character string. In such a case, instead of registering the shape data 524 in the control table 520 of FIG. 5, character string data (character code, font type and size, and the like) may be entered. It is apparent that the registration of the function button information may be performed either by the creator of the electronic mail message, namely the sender of the electronic mail or by a mail system administrator in advance. It is also apparent that the registration may be performed before a mail application provider registers a mail application in the function table 530 of FIG. 5. Thus, the processing that the sender of an electronic mail requests, in the electronic mail, its recipient to perform can be easily registered as the information added to the electronic mail.

The manner in which the sender of an electronic mail combines the individual processing operations registered in the above-mentioned control table to define in time series the processing operations that the sender requests the recipient to perform is now described. To combine individual processing operations registered in the control table, it is necessary to confirm the function button information registered in the control table. For this purpose, the system of the present invention provides a function button list window 800 as shown in FIG. 8, for example. In the figure, reference numeral 810 indicates an area for displaying the graphic images of function buttons and reference numeral 820 indicates an area for displaying outline information texts (the outline information 533 in the function table 530 of FIG. 5) describing the processing to be performed by the function buttons.

A structure of data to be created when displaying the function button list window 800 is described with reference to FIG. 9, for example, wherein a table 900 includes an area 910 for storing display position information of the function button 810 in the function button list window 800, and an area 920 is provided for storing button IDs that indicate the identifiers of the function buttons. It should be noted that the button IDs correspond to the button IDs 520 stored in the above-mentioned control table 520 of FIG. 5. Therefore, searching the list of the control table of FIG. 5 by using the button IDs as keys provides the corresponding button name 522, function ID 523, and shape data pointer 524. Searching the function table 530 of FIG. 5 by using the obtained function IDs 523 as keys provides the function outline 533 of the corresponding function buttons. In addition, from the obtained shape data pointer 524, the shape data necessary for displaying functions buttons are obtained.

On the other hand, the display positions of the function buttons 810 in the function button list window 800 are determined uniquely for the button IDs. Referencing the control tables provides the display position information, functional outline information, button name and shape data in the function button list window 800 for each function button to display the function button list 810 and the functional outline information 820 in the window 800.

Figure 10:
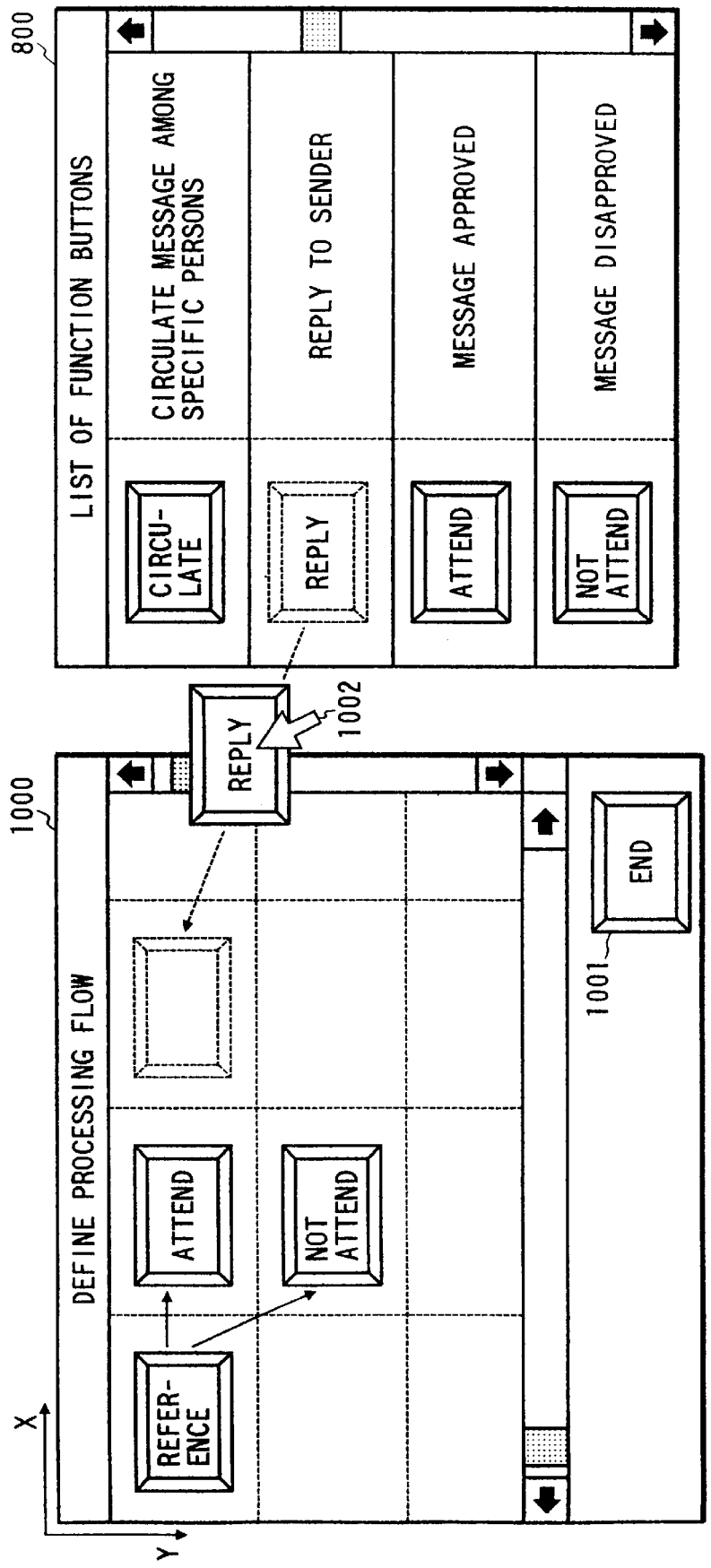
FIG. 10 is a schematic diagram illustrating an example of the operating method for defining the processing flow in accordance with the present invention.

The present invention enables the sender of an electronic mail to combine individual processing operations while checking the information associated with the function buttons registered in the control table in the function button list window 800 in order to define in time series the processing operations that the sender requests the recipient to perform by referring to FIG. 10, which shows an example of a processing flow definition window in which processing operations registered in the control table are combined to define in time series the processing operations that the sender requests the recipient to perform. Namely, the processing flow is defined in this window.

In FIG. 10, reference numeral 1000 indicates the processing flow definition window. The window is divided into cells. The function buttons selected in the function button list windows 800 can be arranged in the cells. The function buttons displayed in the processing flow definition window 1000 can be linked with lines (single-sided arrow lines) to define a processing flow. The selection of function buttons, arrangement of buttons in the window, and linking of buttons are performed by operating a mouse cursor 1002. Reference numeral 1001 indicates an end button to be pressed when storing the defined processing flow information and instructing an end of the processing.

Figure 11:
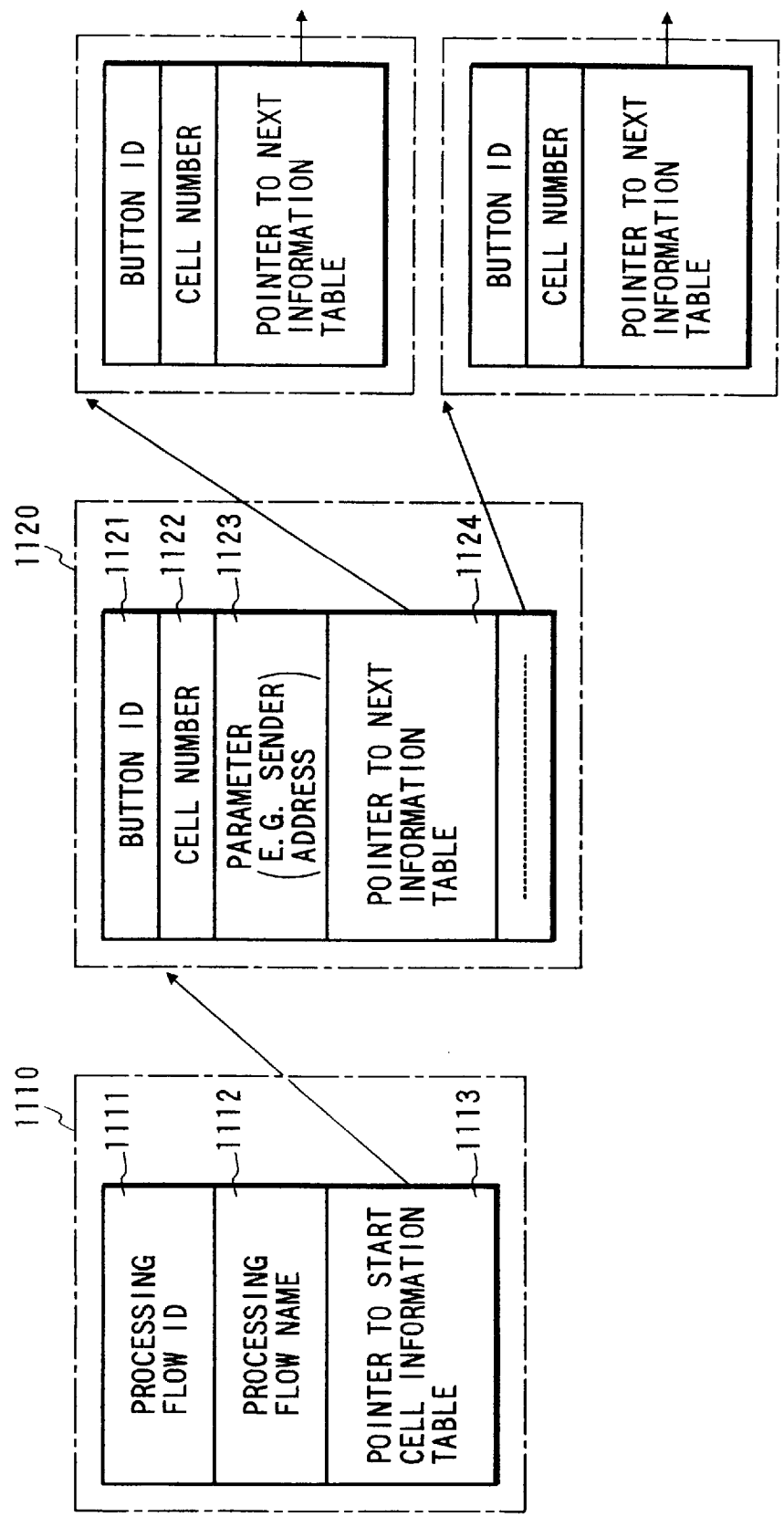
FIG. 11 is a schematic diagram illustrating the structure of data for holding defined processing flow information in accordance with the present invention.

A data structure in which the defined processing flow information is stored is described with reference to FIG. 11. Data in which the processing flow information of FIG. 11 is stored is added to mail data of the electronic mail to be sent, along with data in which the function button information arranged in a message of the electronic mail of FIG. 15. As shown in FIG. 10, an X-axis and a Y-axis are provided, and in the following description, a position of a cell in the processing flow definition window 1000 is represented as (X, Y).

Referring to FIG. 11, reference numeral 1120 indicates a cell information table that holds cell information for each cell. As shown, the cell information tables are linked to each other by a list. A header 1110 of the list of the cell information table has an area 1111 for storing a processing flow ID indicating an identifier of processing flow, an area 1112 for storing a processing flow name indicating the name of the processing flow concerned, and an area 1113 for storing a pointer to a start cell information table of the processing flow concerned. The cell information table 1120 has an area 1121 for storing a button ID of a function button to be arranged in the cell concerned, an area 1122 for storing a cell number (for example, (1,1)) uniquely assigned to the cell concerned, an area 1123 for storing a parameter to be given to the processing to be performed by the function button concerned, and an area 1124 for storing a pointer to a cell information table of a cell arranged with a function button to perform the next processing. The parameter denotes information necessary for executing the processing corresponding to the function button. For example, for the function of referencing the attached data, information such as a name of a file to be referenced and a name of the software to be used for the referencing provides the parameter. It should be noted that this information is stored in the area 1123 only when the parameter is required to execute the processing corresponding to the function button. However, the button ID held in the cell information table corresponds to the button ID 521 held in the above-mentioned control table (FIG. 5). Therefore, searching the list of the control table 520 (FIG. 5) by using the this button ID as the key provides the button name 522 of the function button arranged in the cell, the function ID 523 and the like. In addition, referencing the function table 530 (FIG. 5) by using the obtained function ID 523 as the key provides the function outline information 533 of the corresponding function button.

Since the structure of the data in which the defined processing flow information is stored has the list of the cell information tables, the sender of an electronic mail can define in time series the processing operations to be performed by the recipient of the mail. That is, following the list determines the order in which the recipient performs the requested processing operations. It is apparent that, when defining branch processing and the like, a plurality of areas for storing the pointers to processing flow start cell information tables can be allocated and a plurality of areas for storing the pointers to next cell information tables can be allocated.

Figure 12:
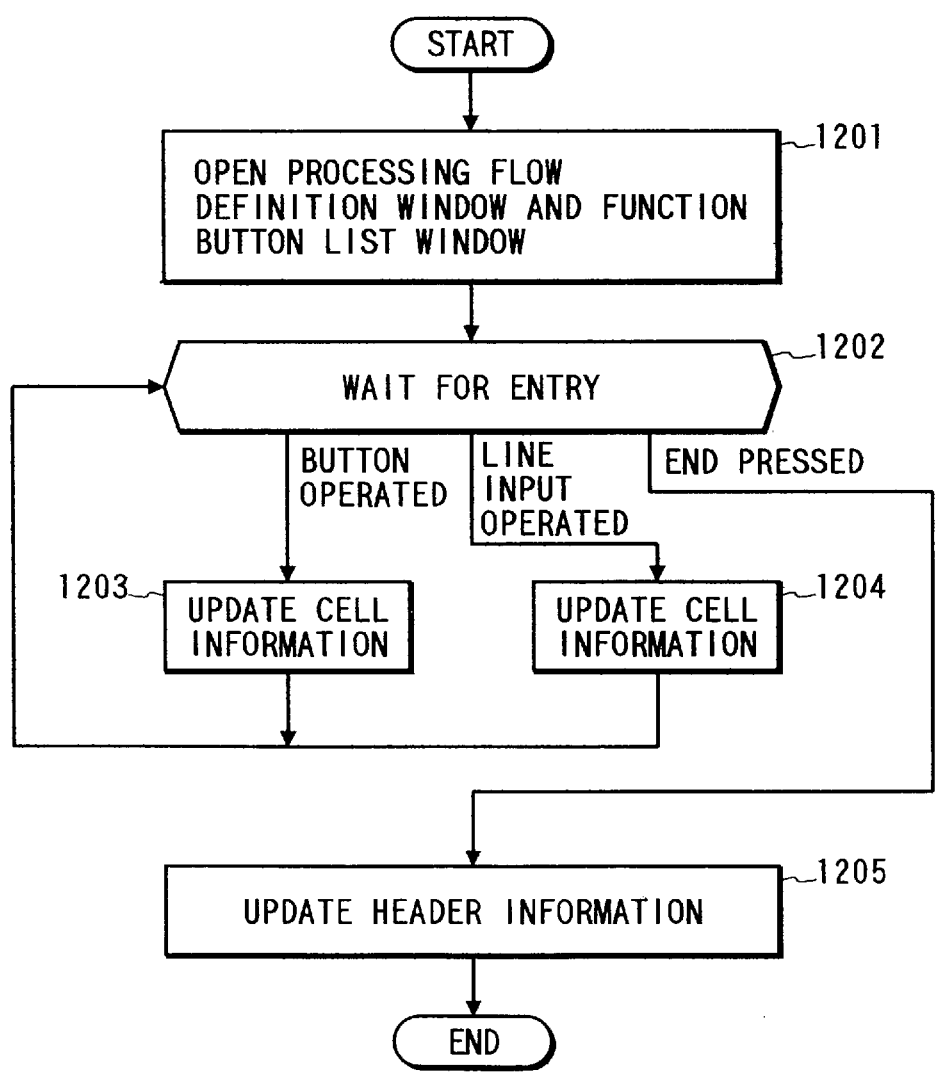
FIG. 12 is a flowchart describing the processing for defining the processing flow in accordance with the present invention.

The following summarizes the processing procedure for defining the processing flow in FIG. 12 with reference to FIG. 10, wherein FIG. 12 shows a flowchart describing the processing procedure for defining the processing flow in the system of the present invention. Referring to FIG. 12, first, the processing flow definition window 1000 and the function button list window 800 (FIG. 10) are opened by user instruction in step 1201. At this time, if a registered processing flow is to be updated, the defined processing flow list is displayed, the selection of the processing flow to updated is accepted or approved, and then the corresponding processing flow definition window is opened. Then, in step 1202, the entry in the processing flow definition window is awaited. This entry denotes the selection of function buttons, the arrangement of the selected buttons into cells, and the linking of the buttons, operated with a mouse or the like. When the selected function buttons have been arranged in the cells, the processing goes to step 1203. When the buttons have been linked to each other, the processing goes to step 1204. When the end button has been pressed, the processing goes to step 1205.

The processing to be performed when the selected function buttons have been arranged in cells is now described. In step 1203 of FIG. 12, a data area for a new cell information table is allocated to register, in the new cell information table 1120, the button ID of the function button specified in the function button list window 800 and the cell number of the cell concerned. If the parameter is necessary for the processing to be performed by the arranged function button, the user is requested to enter the parameter. The accepted parameter is stored in the area 1123 of the cell information table 1120. For requesting the entry, a parameter entry box or the like may be used. Conversely, if the function button has been removed from the cell, the cell information table list is searched to delete the cell information table holding the corresponding function button ID from the cell information table list. Then, the processing goes back to step 1202 to wait for an entry.

When the function buttons have been linked, namely the two specified function buttons are linked to each other in the direction of the one-sided arrow in the processing flow definition window 1000, the following processing is performed. When the buttons to be linked to each other are specified in the window 1000, the pointer storage area 1124 of the next cell information table in the cell information table 1120 of the cell (the start point of the arrow) in which the first specified function button is arranged stores the pointer to the cell information table of the cell in which the second specified function button is arranged (the end point of the arrow). That is, the cell information table of the cell in which the newly linked function button has been arranged is added to the cell information table list. Conversely, if the link of the function buttons is cleared, the pointer to the next cell information table stored in the cell information table 1120 of the corresponding cell is deleted.

When the end button has been pressed, the header 1110 of the list of the cell information table is newly registered or updated. If the processing flow is newly created, the entry of the processing flow name is accepted or approved, the processing flow ID is uniquely assigned to the processing flow data concerned to be stored in the processing flow name storage area 1112 and processing flow ID storage area 1111 of the header 1110. Further, the pointer to the start cell information table of the processing flow concerned is stored in the pointer storage area 1113. The pointer to the start cell information table of the processing denotes the pointer to the cell information table of any cell in which a function button providing no end point of the arrow from any other function button is arranged. Consequently, if there are a plurality of pointers, a plurality of pointer storage areas are provided. If the processing flow has been altered, the header 1110, namely the processing flow name 1112 is updated only when the processing flow name has been altered.

The above-mentioned series of processing operations enable the sender of an electronic mail to easily combine desired individual processing operations that the sender requests the recipient to perform, thereby defining the processing operations in time series.

When creating a message, the sender of an electronic mail arranges the function buttons registered in the processing flow information in that message, wherein FIG. 13 shows an example of a message creating window to be used for above-mentioned message creation. As shown in the figure, the sender of an electronic mail first creates a message in a message display section 1301 in the message creating window 1300. Then, the sender arranges desired function buttons by following an operational procedure of arranging, in the message of the electronic mail, the function buttons registered in the processing flow information, as described with reference to FIG. 14, for example.

Figure 14:
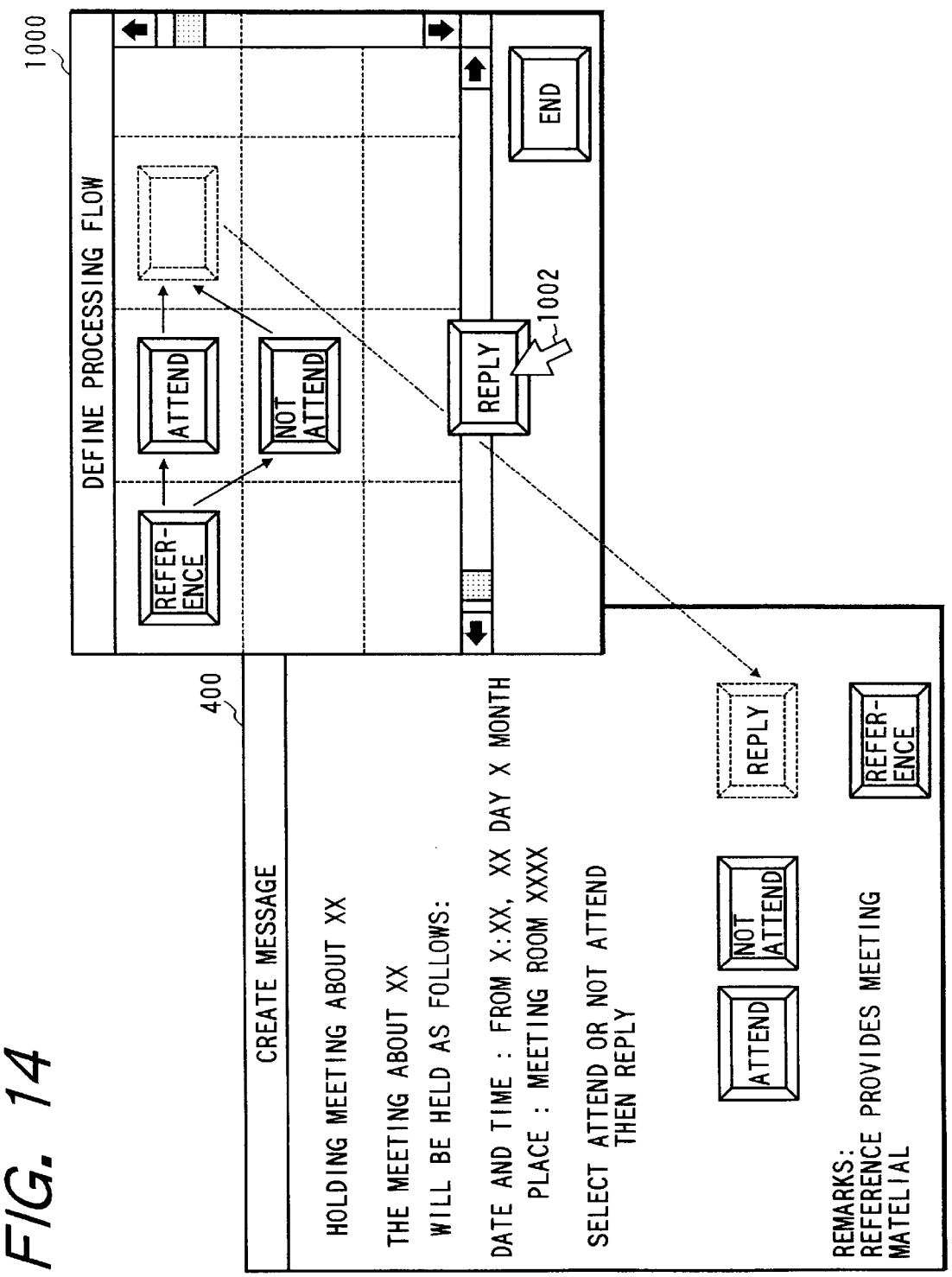
FIG. 14 is a schematic diagram illustrating an example of an operating method for arranging function buttons defined in the processing flow into the message to be sent in accordance with the present invention.

The processing flow definition window 1000 of FIG. 14 shows the processing flow information set by the sender in the electronic mail to be sent. Any of the function buttons displayed in the processing flow definition window 1000 is selected by the mouse cursor 1002 and moved to a desired position in the message displayed in the message creation window 400.

A structure of the data in which the function button information arranged in the electronic mail message is stored is described with reference to FIG. 15, followed by the description of the processing in which, when creating the message, the sender of the electronic mail arranges the function buttons registered in the processing flow information in the message concerned. The data of FIG. 15 is added to the data of the electronic mail to be sent, along with the data containing the processing flow information of FIG. 11.

Figure 15:
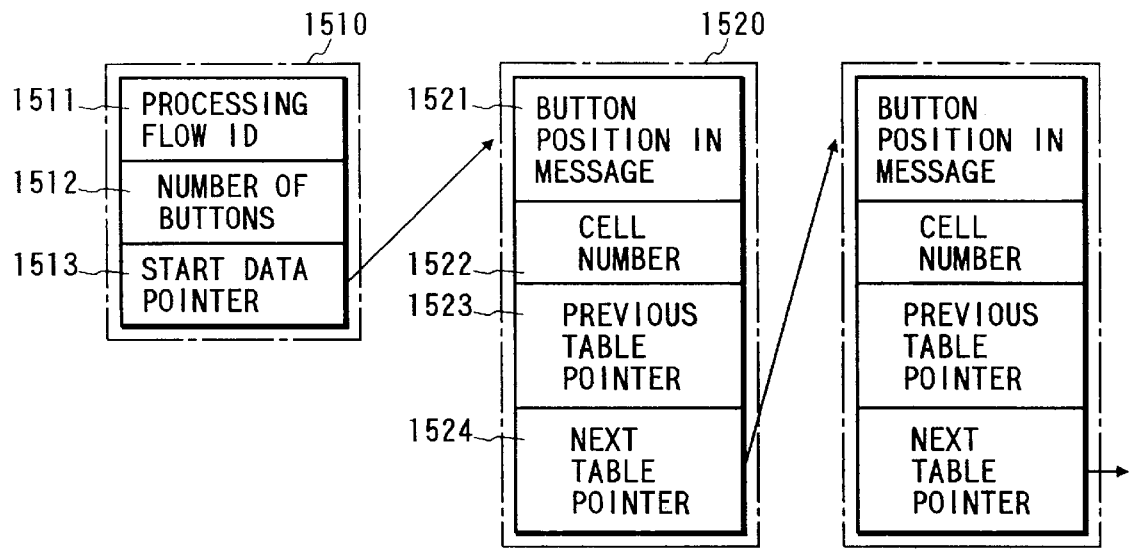
FIG. 15 is a schematic diagram illustrating the structure of data for holding the information for arranging function buttons in the message to be sent in accordance with the present invention.

Referring to FIG. 15, reference numeral 1520 indicates a table for holding, for each of the function buttons, the information about the function buttons arranged in the electronic mail message. As shown, the tables are linked to each other with a list. A header 1510 of the table list includes an area 1511 for storing the processing flow ID, namely the identifier of the processing flow, an area 1512 for storing the number of function buttons arranged in the message, and an area 1513 for storing the pointer to the start table of the table list of the information about the function buttons arranged in the message. The table 1520 includes an area 1521 for storing the position at which the function button is arranged in the message, an area 1522 for storing the cell number assigned to the cell in which the function button concerned is arranged in the processing flow definition window, an area 1523 for storing the pointer to the previous table, and an area 1524 for storing the pointer to the next table.

Figure 16:
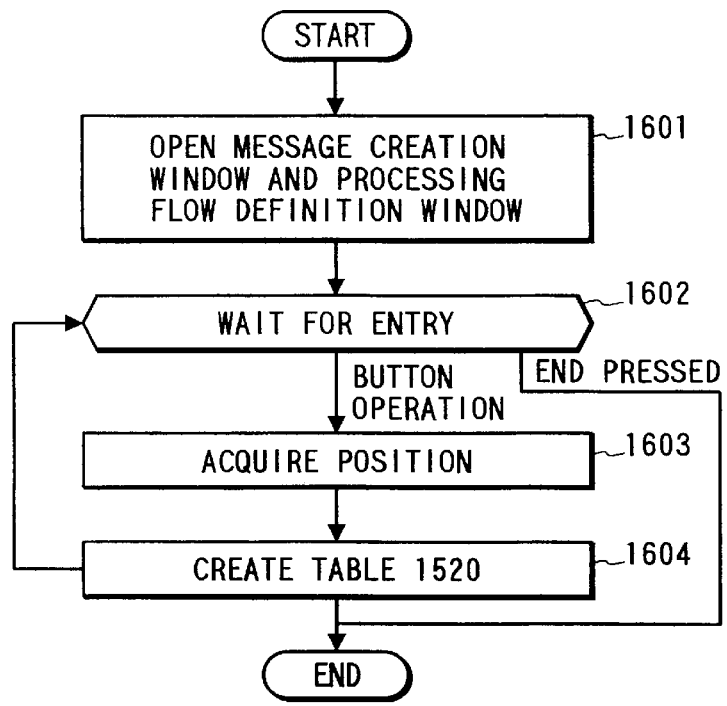
FIG. 16 is a flowchart describing the processing for arranging function buttons in the message to be sent in accordance with the present invention.

When creating the message, the sender of the electronic mail arranges the function buttons registered in the processing flow with a processing, described with reference to FIG. 16, which shows a flowchart of a processing procedure in which the function buttons registered in the processing flow information are arranged in the electronic mail message and data of FIG. 15 having the arrangement information is created. In FIG. 16, the message creating window 400 and the processing flow definition window 1000 (FIG. 14) are opened by a user instruction in step 1601. Then, in step 1602, an entry of an instruction to arrange the function buttons in the message is awaited. The entry denotes the selection of the function buttons and the movement of a desired function button to the message as performed in the processing flow definition window 1000 as described above. If the desired function button has been moved to the message, the processing goes to step 1603. If the end button has been pressed, the processing of arranging the function button into the message ends.

When the function button has been arranged into the message, the following processing is performed wherein in step 1603, a position to which the function button concerned is arranged in the message is acquired. Then, in step 1604, the new table area 1520 (FIG. 15) is allocated in which the function button arrangement position in the message acquired in step 1603 and the cell number of the cell in which the function button concerned has been arranged in the processing flow definition window 1000 are stored. Then, the processing goes back to step 1602 to wait again for an entry.

The above-mentioned processing allows the sender of an electronic mail to easily arrange, in the message of the electronic mail, the function buttons corresponding to the processing that the sender requests the recipient of the electronic mail to perform. At the same time, the data of FIG. 15 to be attached to the mail data of the electronic mail is created. Thus, the processing in which the function buttons registered in the processing flow information are arranged in the electronic mail message is performed.

Figure 17:
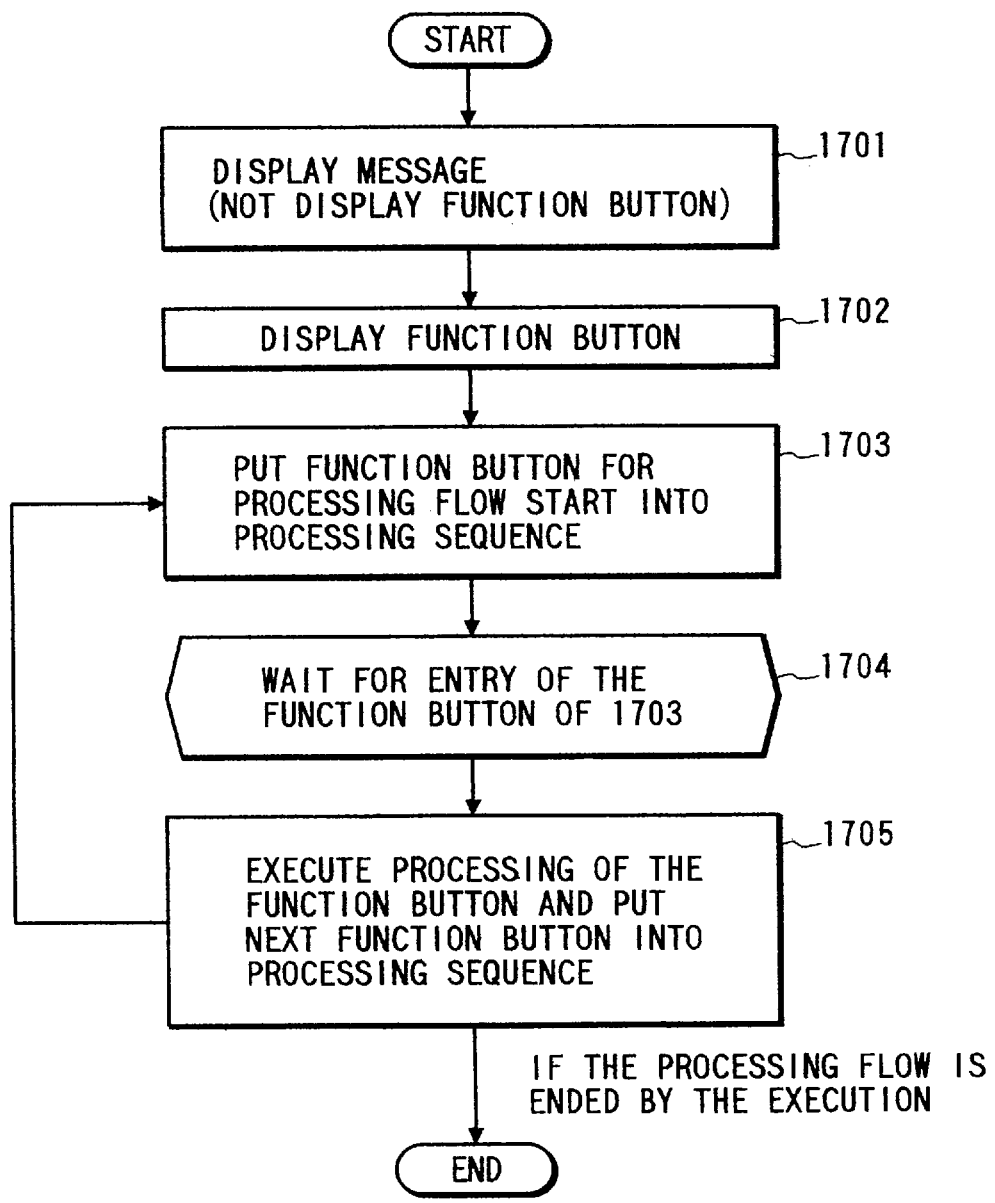
FIG. 17 is a flowchart describing the processing for making the recipient execute the processing according to the defined processing flow in accordance with the present invention.
Figure 18:
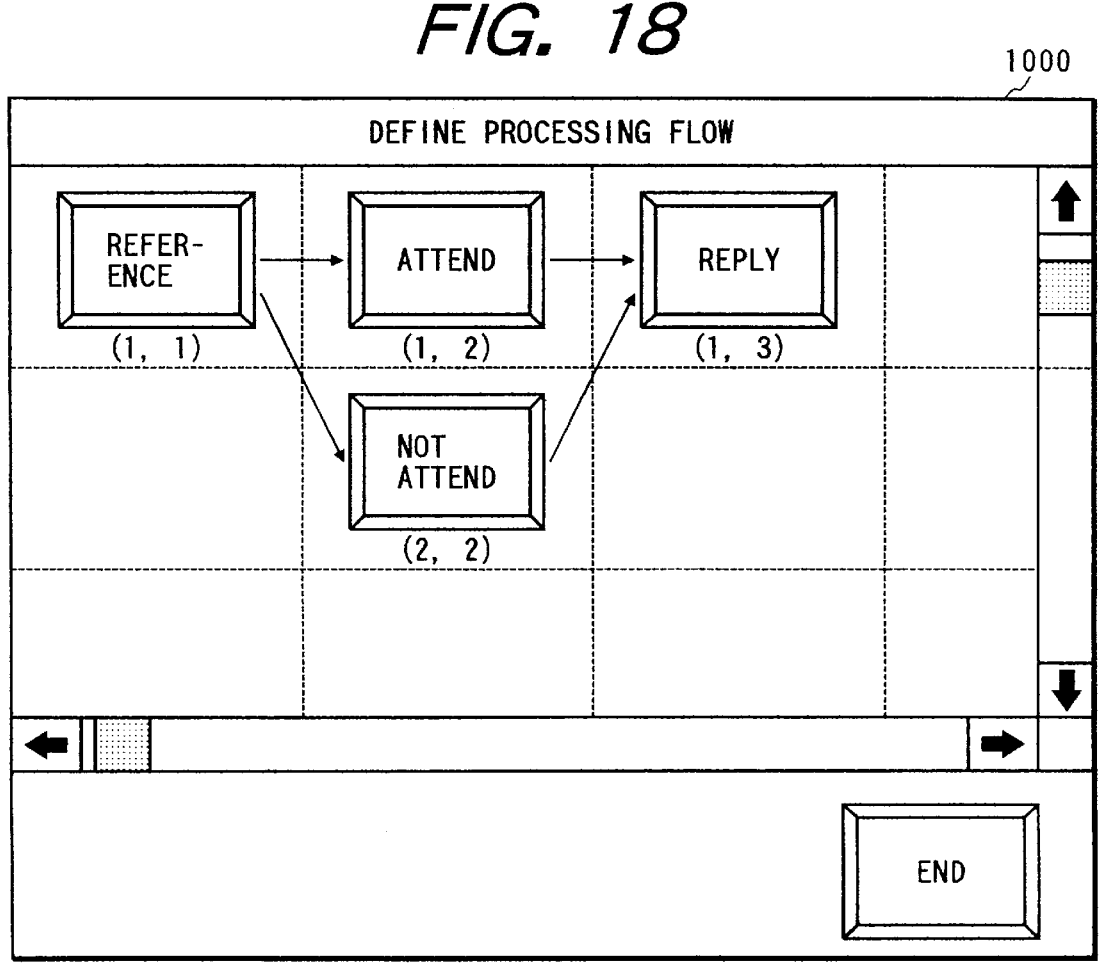
FIG. 18 is a schematic diagram illustrating an example of the processing flow definition window of FIGS. 16 and 17.
Figure 19:
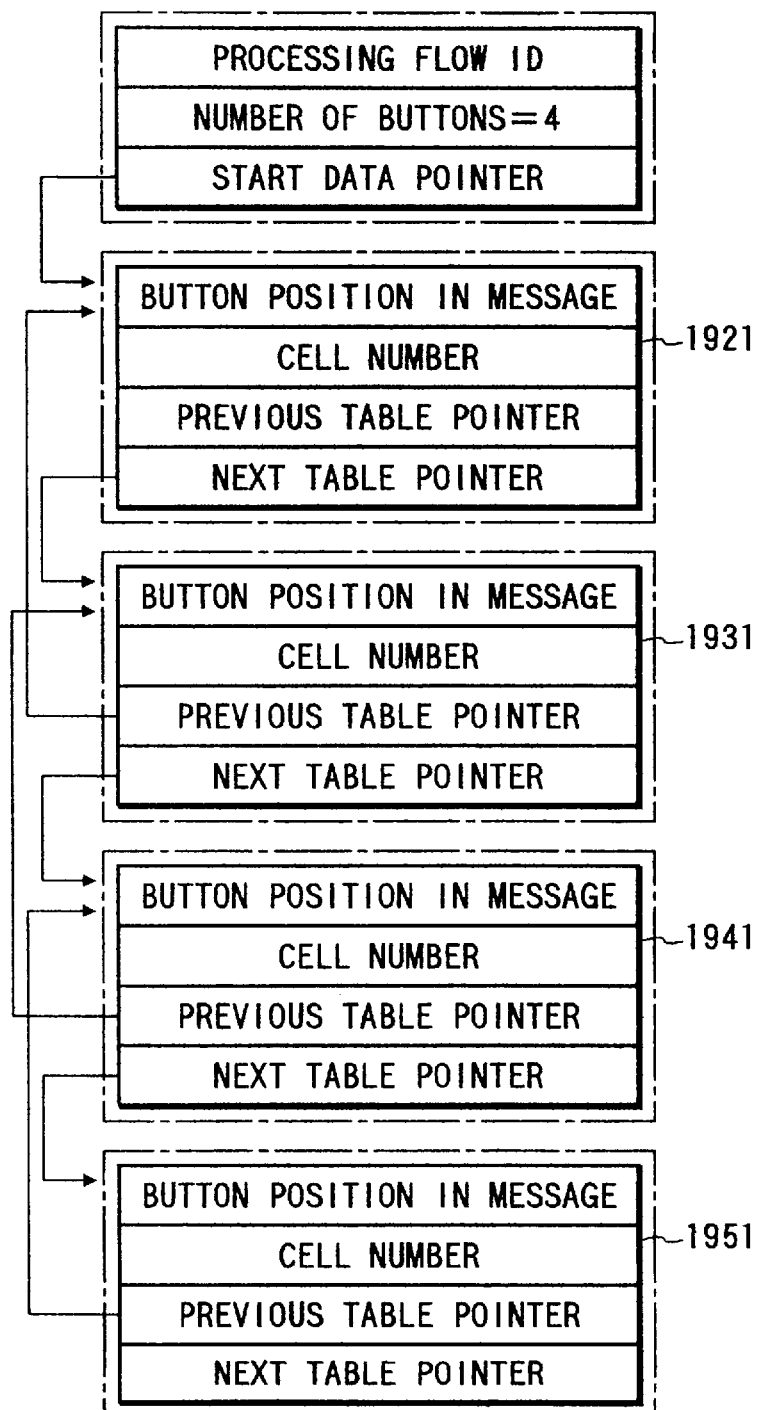
FIG. 19 is a schematic diagram illustrating the structure of data of the processing flow defined in the processing flow definition window of FIG. 18.

The processing in which the sender of an electronic mail makes its recipient perform the processing specified by the sender in the electronic mail by using the electronic mail having the message contents of FIG. 4, as an example, is described with reference to FIGS. 17, 18 and 19. The electronic mail received by the recipient is attached with the information created in the above-mentioned manner, namely the processing flow information of the data structure of FIG. 11 and the function button information of the data structure of FIGS. 15 and 19. FIG. 17 shows a flowchart describing a procedure in which the sender makes the recipient perform the specified processing, FIG. 18 shows the processing flow definition window in which the processing flow information is defined when creating a mail message (FIG. 4), and FIG. 19 shows a structure of the data containing the information about the function buttons arranged in the message of the electronic mail, the data being attached to the data of the message of the electronic mail of FIG. 4.

Referring to FIG. 17, when an electronic mail is opened by its recipient, the message is displayed first in step 1701. Next, in step 1702, the information of display positions of the function buttons in the message and the cell numbers are read from the tables 1921, 1931, 1941 and 1951 of FIG. 19. Then, the processing flow information of FIG. 11 is searched by using the obtained cell number as the key to obtained the corresponding button ID. Further, the list of the control table (FIG. 5) is searched by using the obtained button ID as the key to obtain the button name 522 and shape data 524 of the corresponding button ID. The function buttons are displayed at the corresponding positions in the message (FIG. 4). When the display of the function buttons has been completed, the function button to be processed is determined according to the order of registration in the processing flow information, namely by following the list of the cell information tables (FIG. 11). In step 1703, the function button to be processed is the function button "REFERENCE" for example. In step 1704, the entry of the function button to be processed is awaited. When the entry has been accepted, the processing goes to step 1705. If an entry is made for any function button other than the one t o be processed, no processing is performed. If the function buttons other than the one to be processed are displayed dimly to indicate that those function buttons are not subject to the processing, the operator error can be minimized. Also, an alarm may be sounded or a display warning message may be provided if the operator attempts to enter any of the function buttons not subject to the processing.

When the entry o f the function button to b e processed has been accepted in step 1704, the following processing is performed. In step 1705, the function defined in the function button concerned is executed and, by following the list of the cell information tables (FIG. 11), a function button registered in the cell information table next to the currently referenced cell information table is made subject to the processing, and the processing goes back to step 1704. This processing is repeated until the last cell information table in the list of cell information table is referenced. When the last cell information table has been referenced, the function defined in the function button is executed and the processing flow is ended. The processing corresponding to each function button is performed by searching the list o f control tables (FIG. 5) by using the button ID of the function button whose entry has been accepted as the key to obtain the function ID 521 and by searching the function table 530 (FIG. 5) by using the obtained function ID 523 as the key to obtain the function script 534 indicated by the function ID.

The above-mentioned series of processing operations enable the sender to make the recipient perform the processing in the predetermined order. That is, the recipient of the electronic mail can surely perform such processing operations associated with the electronic mail as approval, circulation, reply, and reference to attached material. In addition, if it is not always necessary to define the processing flow and the processing operations need not be sequenced, the function buttons for executing the processing may only be arranged in the message of the electronic mail in any position. In this case, desired function buttons may be arranged from the function button list window of FIG. 8 directly into the message of the electronic mail to be sent, for example.

The mail data thus created includes, in addition to text data, data about the processing flow, so that this mail data is different from ordinary electronic mail data having only a message. Therefore, it is necessary to attach an identification code to the head of the electronic mail data created in the system associated with the present invention to distinguish the same from the ordinary electronic mail data. A method of distinguishing between a plurality of types of mail data and processing such mail data is disclosed in Japanese Patent Laid-Open No. Hei 5-68053.

According to the present invention, the recipient of an electronic mail can intuitively and easily perform the processing registered beforehand and requested by the sender in that mail. Further, the electronic mail system according to the invention also enables the sender of an electronic mail to easily define the processing that the sender requests the recipient to perform. For example, a message can be returned to the sender indicating that the recipient has received the electronic mail irrespective of whether or not the recipient actually desires to respond thereto. Further, information for processing of the electronic mail in relation to format thereof, for example, may be included to obtain proper receipt.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An electronic mail system for sending electronic mail by attaching, to data of the electronic mail, predetermined processing operations that a sender of the electronic mail requests performed via recipient interaction with the electronic mail, comprising:

a processing information table for registering therein processing definition information defining processing operations to be performed on the electronic mail and function names for identifying the processing operations;

first selecting means for accepting the selection of any function name from among the function names registered in the processing information table;

first icon generating means for generating icons corresponding one by one to the function names selected by the first selecting means;

second selecting means for accepting the selection of icons from among the icons generated by the first icon generating means, the selected icons corresponding to the function names identifying the predetermined processing operations to be performed via recipient interaction with the electronic mail;

first display means for displaying the icons selected by the second "electing means in a message of data of the electronic mail at positions specified by the sender; and attaching means for attaching, to the data of the electronic mail, correspondence information in which positional information for specifying the positions in the message of the icons displayed by said first display means is related to the function names corresponding to the icons so as to enable icons to be generated on the receiving side of electronic mail at the positions specified by the positional information; and further comprising on the receiving side of the electronic mail:

referencing icon generating means for referencing the correspondence information attached by the attaching means to obtain the positional information of the icons and for generating the icons in the message of the received electronic mail at the positions specified by the obtained positional information; and executing means for referencing the correspondence information attached by the attaching means, if the icons are specified, to obtain the function names corresponding to the icons, and for referencing the processing information table to obtain processing execution information identified by the function names corresponding to the icons so as to allow recipient interaction and execution of the predetermined processing operations.

2. An electronic mail system according to claim 1, further comprising:

input means for accepting the entry of processing names assigned by the sender to the function names selected by the first selecting means; and second icon generating means for generating icons corresponding to the function names so that the icons are displayed with the processing names for which entry has been accepted by the input means;

wherein the attaching means attaches, to the data of the electronic mail, the positional information for specifying the positions in the message of the icons displayed by the first display means and the correspondence information in which the function names corresponding to the icons are related to the processing names assigned to the function names corresponding to the icons for which entry has been accepted by the input means.

3. An electronic mail system according to claim 2, wherein, when the electronic mail has been received, the referencing icon generating means references the correspondence information attached by the attaching means to obtain the processing names assigned to the function names corresponding to the icons and generates the icons corresponding to the function names so that the icons are displayed with the obtained processing names.

4. An electronic mail system according to claim 1, further comprising function name display means for displaying a list of the function names registered in the processing information table, wherein the first selecting means accepts the selection of any function name from among the function names displayed in the list by the function name display means.

5. An electronic mail system according to claim 1, further comprising icon display means for displaying a list of the icons corresponding, one by one, to the function names selected by the first selecting means, wherein the second selecting means accepts the selection of any icon from among the icons displayed in the list by the icon display means.

6. An electronic mail system according to claim 1, further comprising:

processing flow defining means for accepting a specification of a sequence of a plurality of icons included in the icons selected by the second selecting means;

the attaching means attaching, to the data of the electronic mail, icon sequence information for defining the sequence of the icons specified by the processing flow defining means and the correspondence information in which positional information for specifying the positions in the message of the electronic mail of the icons displayed by the first display means is related to the function names corresponding to the icons;

wherein the icon sequence of which specification has been accepted by the processing flow defining means specifies a sequence of executing the predetermined processing operations identified by the function names corresponding to the icons, the predetermined processing operations to be executed by the recipient of the electronic mail and the icons being generated, on the receiving side of the electronic mail, in the message of the electronic mail at the positions specified by the positional information.

7. An electronic mail system according to claim 6, wherein said executing means for referencing the correspondence information attached by the attaching means, if the icons are specified according to the sequence of the icons defined by the sequence information of the icons attached by the attaching means, to-obtain the function names corresponding to the icons, and for referencing the processing information table to obtain processing execution information identified by the function names corresponding to the icons so as to allow recipient interaction and execution of the predetermined processing operations.

8. An electronic mail system according to claim 6, further comprising:

input means for accepting the entry of processing names assigned by the sender of the electronic mail to the function names selected by the first selecting means; and second icon generating means for generating icons corresponding to the function names, the icons being displayed with the processing names for which entry has been accepted by the input means;

wherein the attaching means attaches, to the data of the electronic mail to be sent, the sequence information of the icons specified by the processing flow defining means, the positional information for specifying the positions of the icons displayed by the first display means in the message of the electronic mail, and the correspondence information in which the function names corresponding to the icons are related to the processing names assigned to the function names corresponding to the icons for which entry has been accepted by the input means.

9. An electronic mail system according to claim 6, further comprising:

a definition window for displaying a list of the icons selected by the second selecting means;

wherein the processing flow defining means accepts the specification of a sequence for sequencing a plurality of icons by a line or an arrow for connecting the plurality of icons to each other, the plurality of icons being included in the icons having the list thereof displayed in the definition window.

10. An electronic mail system according to claim 7 further comprising:

input means for accepting the entry of processing names assigned by the sender of the electronic mail to the function names selected by the first selecting means; and second icon generating means for generating icons corresponding to the function names, the icons being displayed with the processing names for which entry has been accepted by the input means;

wherein the attaching means attaches, to the data of the electronic mail to be sent, the sequence information of the icons specified by the processing flow defining means, the positional information for specifying the positions of the icons displayed by the first display means in the message of the electronic mail, and the correspondence information in which the function names corresponding to the icons are related to the processing names assigned to the function names corresponding to the icons for which entry has been accepted by the input means.

11. An electronic mail system according to claim 10, further comprising:

a definition window for displaying a list of the icons selected by the second selecting means;

wherein the processing flow defining means accepts the specification of a sequence for sequencing a plurality of icons by a line or an arrow for connecting the plurality of icons to each other, the plurality of icons being included in the icons having the list thereof displayed in the definition window.

12. An electronic mail system according to claim 1, further comprising:

input means for accepting the entry of processing names assigned by the sender to the function names selected by the first selecting means; and second icon generating means for generating icons corresponding to the function names so that the icons are displayed with the processing names for which entry has been accepted by the input means;

wherein the attaching means attaches, to the data of the electronic mail, the positional information for specifying the positions in the message of the icons displayed by the first display means and the correspondence information in which the function names corresponding to the icons are related to the processing names assigned to the function names corresponding to the icons for which entry has been accepted by the input means.

13. An electronic mail system according to claim 12, wherein, when the electronic mail has been received, the referencing icon generating means references the correspondence information attached by the attaching means to obtain the processing names assigned to the function names corresponding to the icons and generates the icons corresponding to the function names so that the icons are displayed with the obtained processing names.

14. An electronic mail system according to claim 13, further comprising function name display means for displaying a list of the function names registered in the processing information table, wherein the first selecting means accepts the selection of any function name from among the function names displayed in the list by the function name display means.

15. An electronic mail system according to claim 14, further comprising icon display means for displaying a list of the icons corresponding, one by one, to the function names selected by the first selecting means, wherein the second selecting means accepts the selection of any icon from among the icons displayed in the list by the icon display means.

16. An electronic mail method for sending electronic mail by attaching, to data of the electronic mail, predetermined processing operations that a sender of the electronic mail requests performed via recipient interaction with the electronic mail, comprising the steps of:

registering in a processing information table processing definition information defining processing operations to be performed on the electronic mail and function names for identifying the processing operations;

accepting the selection of any function name from among the function names registered in the processing information table;

generating icons corresponding one by one to the function names accepted;

accepting the selection of icon" from among the icons generated, the selected icons corresponding to the function names identifying the predetermined processing operations to be performed via recipient interaction with the electronic mail;

displaying the icons accepted in a message of data of the electronic mail at positions specified by the sender; and attaching, to the data of the electronic mail, correspondence information in which positional information for specifying the positions in the message of the electronic mail of the icons displayed is related to the function names corresponding to the icons so as to enable icons to be generated on the receiving side of electronic mail at the positions specified by the positional information; and further comprising, on the receiving side of the electronic mail, the steps of:

referencing the correspondence information attached to the electronic mail to obtain the positional information of the icons and generating the icons in the message of the received electronic mail at the positions specified by the obtained positional information; and referencing the correspondence information attached, if the icons are specified, to obtain the function names corresponding to the icons, and referencing the processing information table to obtain processing execution information identified by the function names corresponding to the icons so as to allow recipient interaction and execution of the predetermined processing operations.

17. An electronic mail method according to claim 16, further comprising the steps of:

accepting the entry of processing names assigned by the sender to the function names selected by the first selecting means; and generating icons corresponding to the function names so that the icons are displayed with the processing names for which entry has been accepted;

wherein the positional information for specifying the positions in the message of the electronic mail of the icons displayed and the correspondence information in which the function names corresponding to the icons are related to the processing names assigned to the function names corresponding to the icons for which entry has been accepted are attached to the data of the electronic mail.

18. An electronic mail method according to claim 17, wherein, when the electronic mail has been received, the steps of referencing the correspondence information attached to the data of the electronic mail to obtain the processing names assigned to the function names corresponding to the icons and generating the icons corresponding to the function names so that the icons are displayed with the obtained processing names.

19. An electronic mail method according to claim 16, further comprising the steps of displaying a list of the function names registered in the processing information table, and accepting the selection of any function name from among the function names displayed in the list by the function name displayed.

20. An electronic mail method according to claim 16, further comprising the steps of displaying a list of the icons corresponding, one by one, to the function names accepted, and accepting the selection of any icon from among the icons displayed in the list.

21. An electronic mail method according to claim 16, further comprising the steps of:

accepting a specification of a sequence of a plurality of icons included in the icons accepted;

attaching, to the data of the electronic mail, icon sequence information for defining the sequence of the icons specified and the correspondence information in which positional information for specifying the positions in the message of the icons displayed is related to the function names corresponding to the icons;

wherein the icon sequence of which specification has been accepted specifies a sequence of executing the processing operations identified by the function names corresponding to the icons, the processing operations to be executed by the recipient of the electronic mail and the icons being generated, on the receiving side of the electronic mail, in the message at the positions specified by the positional information.

22. An electronic mail method according to claim 21, wherein: p1 in said referencing step, referencing the correspondence information attached, if the icons are specified according to the sequence of the icons defined by the sequence information of the icons attached, to obtain the function name corresponding to the icons, and referencing the processing information table to obtain processing execution information identified by the function names corresponding to the icons so as to allow recipient interaction and execution of the predetermined processing operations.

23. An electronic mail method according to claim 21, further comprising the steps of:

accepting the entry of processing names assigned by the sender of the electronic mail to the function names accepted; and generating icons corresponding to the function names, the icons being displayed with the processing names for which entry has been accepted;

wherein the sequence information of the icons specified, the positional information for specifying the positions of the icons displayed by the first display means in the message of the electronic mail, and the correspondence information in which the function names corresponding to the icons are related to the processing names assigned to the function names corresponding to the icons for which entry has been accepted, are attached to the data of the electronic mail to be sent.

24. An electronic mail method according to claim 21, further comprising the steps of providing a definition window for displaying a list of the icons accepted, wherein the specification of a sequence for sequencing a plurality of icons by a line or an arrow for connecting the plurality of icons to each other is accepted, the plurality of icons being included in the icons having the list thereof displayed in the definition window.

* * * * *